Figure 1:
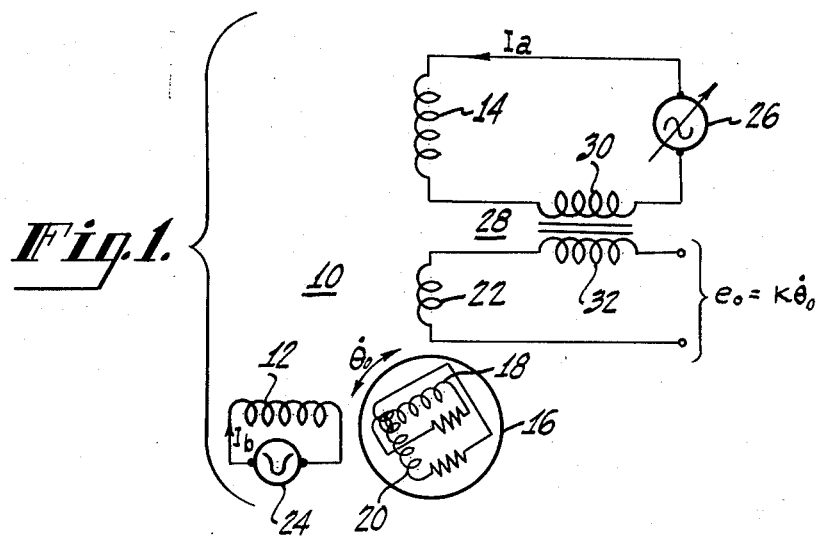

March 9, 1954  A. M. SPIELBERG ET AL  2,671,876
TWO-PHASE MOTOR WITH AN ADDITIONAL SPEED VOLTAGE WINDING
Filed Nov. 29, 1951

INVENTORS:
ARNOLD M. SPIELBERG
AND ROBERT E. KING
BY J. L. Whittaker
ATTORNEY

Patented Mar. 9, 1954

2,671,876

UNITED STATES PATENT OFFICE 2,671,876

TWO-PHASE MOTOR WITH AN ADDITIONAL SPEED VOLTAGE WINDING

Arnold M. Spielberg, Camden, and Robert E. King, Haddonfield, N. J., assignors to Radio Corporation of America, a corporation of Delaware Application November 29, 1951, Serial No. 258,882

14 Claims. (Cl. 318—29)

This invention relates generally to control systems, and more particularly to an electric motor having an auxiliary winding for developing a voltage in response to motor rotation which voltage is proportional to the angular velocity of the motor.

In systems employing a motor to position an object in accordance with the position of a controlling object at a remote point, the natural tendency of the motor is to oscillate about a null position determined by the displacement of the controlling object. The inertia of motor and/or the inertia of the controlled object may cause the controlled object to overshoot or run past the null position. This requires a reversed motor rotation to properly locate the controlled object. If the control sensitivity of the system is reasonably high, sustained oscillation may occur. This effect is known as "hunting" and is a phenomenon to be minimized in any practical motor control system.

Some previous control systems have utilized electrical networks including capacity-resistance time elements, while others utilize impedance bridge networks whereby voltage signals corresponding to rate and/or acceleration are obtained from displacement signals. The derivative signals are then used to modify the displacement signals for reducing oscillatory tendencies of the systems. Still other systems include a tachometer generator which is coupled to the same shaft as the control motor. The tachometer generator produces a voltage proportional to the speed of the control motor which voltage may be used, for example, to damp a servo system. While these systems are generally satisfactory, it is apparent that the above named impedance networks may be frequency sensitive. Also, systems employing a tachometer generator for producing a speed voltage require an auxiliary rotor mechanically coupled to the shaft of the control motor.

To obviate these disadvantages, and for other reasons hereinafter set forth, the instant invention provides an electric motor especially suitable for servo control systems. The motor includes an auxiliary winding for developing a voltage proportional to the angular velocity of the motor, while not requiring an additional rotor. Furthermore, the velocity voltage developed by the motor of the present invention is substantially unaffected by the frequency of signals applied to the motor.

An object of the present invention is to provide an improved means for obtaining a voltage which is proportional to the angular velocity of an electric motor.

Another object of the invention is to provide an improved means for utilizing the driving motor of a control system as a generator of an anti-hunt voltage.

Another object of the invention is to reduce the cost of apparatus required for obtaining such voltages.

Another object of the invention is to provide an improved anti-hunt system requiring a minimum of auxiliary apparatus.

Another object of the invention is to effect a saving in space requirements in such systems.

A further object of the invention is to provide an electric motor for use in a system of the type described, said motor having a substantially high torque-to-inertia ratio.

In a typical embodiment according to the invention, a two-phase electric motor is provided with an auxiliary stator winding coaxially disposed with respect to the variable phase stator winding of the motor. With suitable exciation signals applied to the fixed and variable phase stator windings, motor rotation occurs and a voltage is developed by the auxiliary stator winding. The voltage thus developed normally comprises two components. One component is attributable to the inductive coupling between the coaxial auriliary and variable phase windings, while the second component is proportional to the angular velocity (or speed) of the motor. To eliminate the undesirable component introduced by the aforesaid coupling between the two coaxial stator windings, means are provided for effectively decoupling the coaxial windings such that the undesirable component is neutralized and only the voltage component which is proportional to the angular velocity of the motor appears as a useful output signal.

Figure 2:
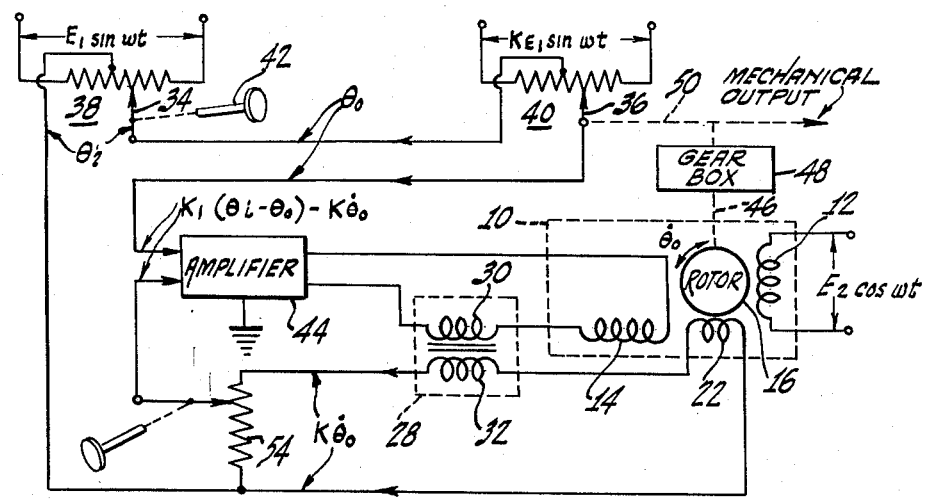

The invention will be described in greater detail with reference to the accompanying drawing in which Figure 1 is a schematic circuit diagram of an electric motor, according to the invention, for producing a voltage proportional to motor angular velcity; and Figure 2 is a schematic circuit diagram, partially in block form, of a control system in which an electric motor, according to the invention, is utilized to prevent "hunting."

Similar reference characters are applied to similar elements throughout the drawings.

Referring to Figure 1, a two-phase electric motor 10 includes a fixed phase stator winding 12, a variable phase stator winding 14, and a rotor 16 which may be resolved from a mathematical standpoint into a pair of rotor windings 18 and 20. Also contained in the motor housing (not shown), and coaxially disposed with respect to the variable phase stator winding 14, is an auxiliary stator winding 22 for developing a voltage proportional to the angular velocity of the motor. Different signal sources 24 and 26 are provided for exciting the fixed and variable phase windings 12 and 14, respectively, to produce motor rotation.

The voltage developed by the auxiliary phase winding 22, however, normally includes at least two voltage components. One component results from the inductive coupling between the rotor 16 and the auxiliary winding 22, which coupling produces a voltage proportional to the angular velocity of the motor. A second, and undesirable, component voltage is attributable to the mutual coupling between the variable phase stator winding 14 and the auxiliary stator winding 22 coaxial therewith, since current flow in the variable phase winding 14 sets up magnetic lines of force which link the turns of the auxiliary winding. Since the total voltage developed by the auxiliary winding 22 thus is not proportional to the speed of the motor, an arrangement is required for neutralizing the voltage component produced by the coaxial disposition of the variable phase and auxiliary windings.

Accordingly, a transformer 28 is provided having separate windings 30 and 32, one of which 30 is connected in series with the variable phase stator winding 14 and the other of which 32 is connected in series opposition with the auxiliary winding 22 to neutralize the voltage induced from the stator winding 14. The transformer 28 is preferably of type having a variable reluctance flux path, the reluctance of which path may be adjusted to provide a mutual inductance between the two transformer windings 30 and 32 which is equal to the mutual inductance between the variable phase and auxiliary stator windings. Also, the turns ratio of the transformer 28 may be adjusted in cooperation with the above selected mutual coupling to afford substantially complete elimination of the undesirable component voltage. The voltage then obtained from the auxiliary winding, as a usable output signal, is proportional to the angular velocity of the motor and may be utilized in a desired manner, for example, to minimize hunting in a motor control system.

A brief mathematical analysis of the above described apparatus may prove helpful in more fully appreciating the invention. In this analysis, $L$ = self inductance of the fixed phase winding
= self inductance of the variable phase winding
$R$ = resistance of the fixed phase winding
= resistance of the variable phase winding
$I_a$ = current in the variable phase winding
$I_b$ = current in the fixed phase winding
$\dot{\theta}_0$ = angular velocity of the rotor
$i_a$ = rotor current resolved parallel to the variable phase axis
$i_b$ = rotor current resolved parallel to the fixed phase axis $$(a+b)^n = a^n + na^{n-1}b + \tfrac{1}{2}n(n-1)a^{n-2}b^2 + \ldots$$

$r$ = resistance of each resolved rotor winding
$M$ = mutual inductance between the rotor and each of the two-phase stator windings
$M_1$ = mutual inductance between the rotor and the auxiliary winding
$M_2$ = mutual inductance between the variable phase winding and the auxiliary winding = mutual inductance between the two windings of the decoupling transformer
$E_1 \sin \omega t$ = applied variable phase voltage
$E_2 \cos \omega t$ = applied fixed phase voltage The analysis is based upon the following simplifying assumptions:

(a) The rotor inductance is very small and for practical purposes may be considered to be negligible.

(b) Derivatives higher in order than the first order produce small terms and are considered negligible.

(c) The effect of iron losses due to eddy currents and hysteresis is neglected.

(d) Consider the steady state condition in which the differential operator $$D = \frac{d}{dt} = j\omega$$

The following general motor equations may then be formulated and solved in a manner similar to that proposed by H. C. Stanley in "An Analysis of the Induction Machine" which appears in the 1938 AIEE Transactions, volume 57, page 753.

(1) $(LD+R)I_a + (0)I_b + MDi_a + (0)i_b = E_1 \sin \omega t$
(2) $(0)I_a + (LD+R)I_b + (0)i_a + MDi_b = E_2 \cos \omega t$
(3) $MDI_a + M\dot{\theta}_0 I_b + ri_a + (0)i_b = 0$
(4) $-M\dot{\theta}_0 I_a + MDI_b + (0)i_a + ri_b = 0$ Solving the simultaneous equations, the determinant of the set of equations is:

$$\Delta = 2Rr^2 LD + R^2 r^2$$

where differentials of higher order than one are neglected. Solving for $i_a$, $$i_a = \frac{1}{\Delta}(M^3 \dot{\theta}_0{}^2 - MrR)DE_1 \sin \omega t - \frac{rM\dot{\theta}_0}{\Delta}(LD+R)E_2 \cos \omega t$$

Since the mutual inductance between the transformer windings is made equal to the mutual inductance between the coaxial stator windings, the voltage developed by the auxiliary winding is $$e_0 = M_1 D i_a + M_2 DI_a - M_2 DI_a$$
$$= M_1 D i_a$$

$$e_0 = \frac{1}{\Delta}(M^3 \dot{\theta}_0{}^2 - MrR)M_1 D^2 E_1 \sin \omega t - \frac{rM\dot{\theta}_0}{\Delta}(LD+R)M_1 DE_2 \cos \omega t =$$

$$-\frac{rMM_1 \dot{\theta}_0 (LD+R)DE_2 \cos \omega t}{Rr^2(2LD+R)}$$

Since the expression $$\frac{1}{(2LD+R)}$$

is of the form $$(R+2LD)^{-1} =$$
$$R^{-1} + (-1)R^{-2}(2LD) + (-1)(-2)R^{-3}\tfrac{1}{2}(2LD)^2 = \frac{1}{R} - \frac{2LD}{R^2}$$

Then, $$e_0 = -\frac{E_2 MM_1 Rr\dot{\theta}_0}{Rr^2}\left(\frac{1}{R} - \frac{2LD}{R^2}\right)D \cos \omega t =$$

$$\frac{E_2 MM_1 \omega Rr\dot{\theta}_0 \sin \omega t}{R^2 r^2} = \frac{E_2 MM_1 \omega}{Rr}(\dot{\theta}_0 \sin \omega t)$$

Thus, $e_0$ is proportional to the angular velocity ($\dot{\theta}_0$) of the machine's rotor.

Referring to Figure 2, a follow-up type control system is shown in which an error signal may be obtained from the positional disagreement of, for example, the movable arms 34 and 36 of two potentiometers 38 and 40. The error signal is proportional to ($\theta_i - \theta_0$), where $\theta_i$ is the displacement of the controlling potentiometer 33 and $\theta_0$ is the displacement of the controlled potentiometer 40. The controlling displacement $\theta_i$ may be obtained by any convenient means such as a rotatable mechanical member 42. The error signal ($\theta_i - \theta_0$) is then preferably amplified in an amplifier 44 and the output signal obtained therefrom applied to the variable phase winding 14 of the motor 10 of the invention. With the fixed phase motor winding 12 excited in phase quadrature, motor rotation is obtained and a voltage $e\theta$ is developed by the cooperative action of the decoupling transformer 28 and the auxiliary winding which voltage is proportional to the angular velocity $\dot{\theta}_0$ of the rotor 16.

This velocity voltage ($K\dot{\theta}_0$) is applied to the amplifier 44 such that the composite signal input is $K_1(\theta_i - \theta_0) - K\dot{\theta}_0$. The velocity (or speed) component of the amplifier input signal is then utilized to reduce the oscillatory tendency of the control motor 10. The shaft 46 of the rotor 16 may be connected to a gear box 48 from which a further mechanical connection 50 may be made to control the position of the controlled object (i. e. the movable arm 36 of the potentiometer 40). The mechanical output motion derived from the gearing arrangement also may be utilized to control a pointer or some other such indicating device (not shown). To afford control of the amount of velocity voltage which is fed back to the amplifier, a potentiometer 52 is provided which is connected in shunt with the auxiliary winding 22 and the decoupling transformer winding serially connected therewith. While the controlling and controlled objects have been shown as potentiometers, it is apparent that synchro-generators or other signal transmitting means may be employed with equal facility.

From the foregoing description, it may be seen that a number of advantages are afforded by the instant invention. One of the features of the invention is that an additional rotor is not required. This results in several advantages among which are an increased torque-to-intertia ratio, reduction in the cost of apparatus for use in servo control systems, and simplification of a "packaging" problem which may exist in such systems. By utilizing the apparatus herein disclosed and claimed, a saving in space of approximately 25% to 50% generally may be effected over tachometer generator arrangements. Furthermore, the instant invention is substantially insensitive to frequency.

What is claimed is:

1. In an electric motor having a plurality of differently phased stator windings having a rotor relatively rotatable with respect thereto, an auxiliary stator winding inductively coupled to one of said stator windings and to said rotor, and additional coupling means coupling said inductively coupled stator and auxiliary windings for neutralizing a voltage induced in said auxiliary winding by said stator coupling whereby a voltage developed by said auxiliary winding in response to motor rotation is proportional to the angular velocity of said rotor.

2. In an electric motor having a plurality of differently phased and oriented stator windings having a rotor relatively rotatable with respect thereto, an auxiliary stator winding coaxially disposed with respect to and inductively coupled to one of said differently phased stator windings and to said rotor, and additional coupling means coupling said inductively coupled stator and auxiliary windings for neutralizing a voltage induced in said auxiliary winding whereby a voltage developed by said auxiliary winding in response to motor rotation is proportional to the angular velocity of said rotor.

3. In an electric motor having a plurality of differently phased and oriented stator windings having a rotor relatively rotatable with respect thereto, an auxiliary stator winding coaxially disposed with respect to and inductively coupled to one of said differently phased stator windings and to said rotor, and transformer means coupling said inductively coupled stator and auxiliary windings for neutralizing a voltage induced in said auxiliary winding whereby a voltage developed by said auxiliary winding in response to motor rotation is proportional to the angular velocity of said rotor.

4. In a two-phase electric motor having a pair of differently phased stator windings having a rotor relatively rotatable with respect thereto, an auxiliary stator winding coaxially disposed with respect to and inductively coupled to only one of said stator windings and to said rotor, and additional coupling means coupling said inductively coupled stator and auxiliary windings for neutralizing a voltage induced in said auxiliary winding by said stator coupling whereby a voltage developed by said auxiliary winding in response to motor rotation is proportional to the angular velocity of said rotor.

5. In a two-phase electric motor having a pair of differently phased stator windings having a rotor relatively rotatable with respect thereto, an auxiliary stator winding coaxially disposed with respect to and inductively coupled to only one of said stator windings and to said rotor, and transformer means coupling said inductively coupled stator and auxiliary windings for neutralizing a voltage induced in said auxiliary winding by said stator coupling whereby a voltage developed by said auxiliary winding in response to motor rotation is proportional to the angular velocity of said rotor.

6. In a two-phase electric motor having a fixed phase stator winding and a variable phase stator winding and having a rotor relatively rotatable with respect thereto, an auxiliary stator winding coaxially disposed with respect to and inductively coupled to said variable phase stator winding and to said rotor, and additional coupling means coupling said inductively coupled variable phase and auxiliary stator windings for neutralizing a voltage induced in said auxiliary winding by said stator coupling whereby a voltage developed by said auxiliary winding in response to motor rotation is proportional to the angular velocity of said rotor.

7. In a two-phase electric motor having a fixed phase stator winding and a variable phase stator winding and having a rotor relatively rotatable with respect thereto, an auxiliary stator winding coaxially disposed with respect to and inductively coupled to said variable phase stator winding and to said rotor, and transformer means coupling said inductively coupled variable phase and auxiliary stator windings for neutralizing a voltage induced in said auxiliary winding by said stator coupling whereby a voltage developed by said auxiliary winding in response to motor rotation is proportional to the angular velocity of said rotor.

8. In a two-phase electric motor having a fixed phase stator winding and a variable phase stator winding and having a rotor relatively rotatable with respect thereto, an auxiliary stator winding coaxially disposed with respect to and inductively coupled to said variable phase stator winding and to said rotor, and a transformer having different windings in circuit with said inductively coupled variable phase and auxiliary stator windings for neutralizing a voltage induced in said auxiliary winding by said stator coupling whereby a voltage developed by said auxiliary winding in response to motor rotation is proportional to the angular velocity of said rotor.

9. In a two-phase electric motor having a fixed phase stator winding and a variable phase stator winding and having a rotor relatively rotatable with respect thereto, an auxiliary stator winding coaxially disposed with respect to and inductively coupled to said variable phase stator winding and to said rotor, and a transformer having different windings serially connected with said inductively coupled variable phase and auxiliary stator windings for neutralizing a voltage induced in said auxiliary winding by said stator coupling whereby a voltage developed by said auxiliary winding in response to motor rotation is proportional to the angular velocity of said rotor.

10. Apparatus as claimed in claim 9 wherein the mutual inductance between said inductively coupled variable phase and auxiliary stator windings is substantially equal to the mutual inductance between the windings of said transformer.

11. A control system comprising a controlling element, a controlled element, means for developing an error signal upon displacement of said controlling element, connection means for a source of fixed phase signals in phase quadrature with said error signals, a two-phase motor having a fixed phase stator winding and a variable phase stator winding and having a rotor relatively rotatable with respect thereto, an auxiliary stator winding coaxially disposed with respect to and inductively coupled to said variable phase stator winding and to said rotor, and a transformer having different windings in circuit with said inductively coupled variable phase and auxiliary stator windings for neutralizing a voltage induced in said auxiliary winding by said stator coupling whereby a voltage developed by said auxiliary winding in response to motor rotation is proportional to the angular velocity of said rotor.

12. A control system comprising a controlling element, a controlled element, means for developing an error signal upon displacement of said controlling element, connection means for a source of fixed phase signals in phase quadrature with said error signals, a two-phase motor having a fixed phase stator winding and a variable phase stator winding and having a rotor relatively rotatable with respect thereto, an auxiliary stator winding coaxially disposed with respect to and inductively coupled to said variable phase stator winding and to said rotor, and a transformer having different windings serially connected with said inductively coupled variable phase and auxiliary stator windings for neutralizing a voltage induced in said auxiliary winding by said stator coupling whereby a voltage developed by said auxiliary winding in response to motor rotation is proportional to the angular velocity of said rotor.

13. A system as claimed in claim 12 including means for applying said proportional voltage to said controlled element to prevent oscillatory movement thereby.

14. A system as claimed in claim 13 including means for controlling the amount of said proportional voltage applied to said controlled element.

ARNOLD M. SPIELBERG.
ROBERT E. KING.

References Cited in the file of this patent

UNITED STATES PATENTS

| Number | Name | Date |
|---|---|---|
| 771,293 | Averrett | Oct. 4, 1904 |
| 2,539,856 | Noodleman | Jan. 30, 1951 |

OTHER REFERENCES

"Servo Mechanism Fundamentals," by Lauer, Lesnick, and Matson, published by McGraw-Hill Book Co., 1st ed., 1947, fig. 419, page 101.